United States Patent [19]

DeFrees

[11] 4,445,533
[45] May 1, 1984

[54] AIR CHECK VALVE ASSEMBLY FOR POWDERED BULK PRODUCT TRANSPORT

[75] Inventor: Joseph H. DeFrees, Warren, Pa.

[73] Assignee: Allegheny Valve Company, Warren, Pa.

[21] Appl. No.: 292,655

[22] Filed: Aug. 13, 1981

[51] Int. Cl.³ .............................................. F16K 15/00
[52] U.S. Cl. ............................... 137/512.1; 137/515.7; 285/112
[58] Field of Search .................. 137/515, 515.3, 515.5, 137/515.7, 527, 512.1; 251/298; 285/112

[56] References Cited

U.S. PATENT DOCUMENTS

| | | | |
|---|---|---|---|
| 3,134,612 | 5/1964 | Glasgow | 285/112 |
| 3,208,472 | 9/1965 | Scaramucci | 137/515.7 |
| 3,351,352 | 11/1967 | Blakeley et al. | 285/112 |
| 3,538,946 | 11/1970 | Hilsheimer | 137/515.5 |
| 3,831,628 | 8/1974 | Kintner et al. | 137/515.7 |
| 3,866,734 | 2/1975 | Elkins et al. | 137/515.5 |
| 4,230,148 | 10/1980 | Ogle, Jr. | 137/527 |

Primary Examiner—Alan Cohan
Assistant Examiner—John A. Rivell
Attorney, Agent, or Firm—Baldwin, Egan, Walling & Fetzer

[57] ABSTRACT

An air fluid check valve for assembly into the interior of a pair of generally axially aligned conduit sections at a separable joint thereof, for use for instance on a bulk hauling transport trailer adapted for handling powdered solids, such as for instance flour, or cement, or like product. The air valve comprises a valve body which is adapted to be readily inserted into and removed from the separable conduit joint, and in one embodiment has a radially extending rim at one end thereof for locating the valve in the interior of the conduit sections at the joint thereof. In another embodiment, bolts connecting flanged portions of the conduit joint, coact in juxtaposed condition with the valve body to locate the valve in proper position at the conduit joint. The valve has at least one opening therethrough which is adapted to be closed by means of a pivotal spring loaded valve plate, which is pivoted to an open position upon application of predetermined fluid pressure in the conduit sections, applied to the valve plate, for passage of fluid through the conduit sections via said opening in the valve body. Sealing means coacts in sealing relation with the adjacent conduit sections and with the valve body, for sealing the separable joint of the conduit, and for preventing leakage of fluid in the conduit sections externally of the valve body.

12 Claims, 13 Drawing Figures

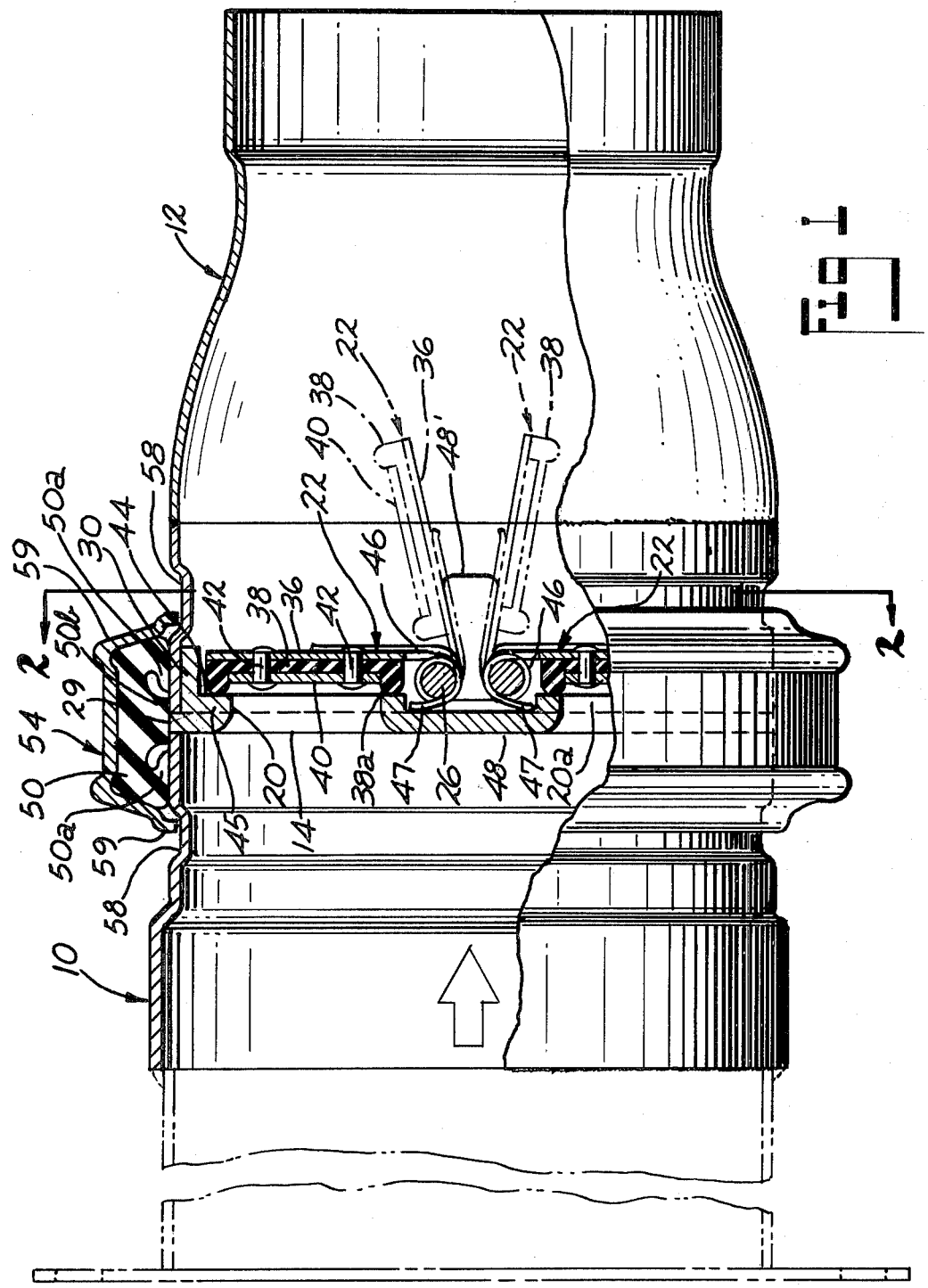

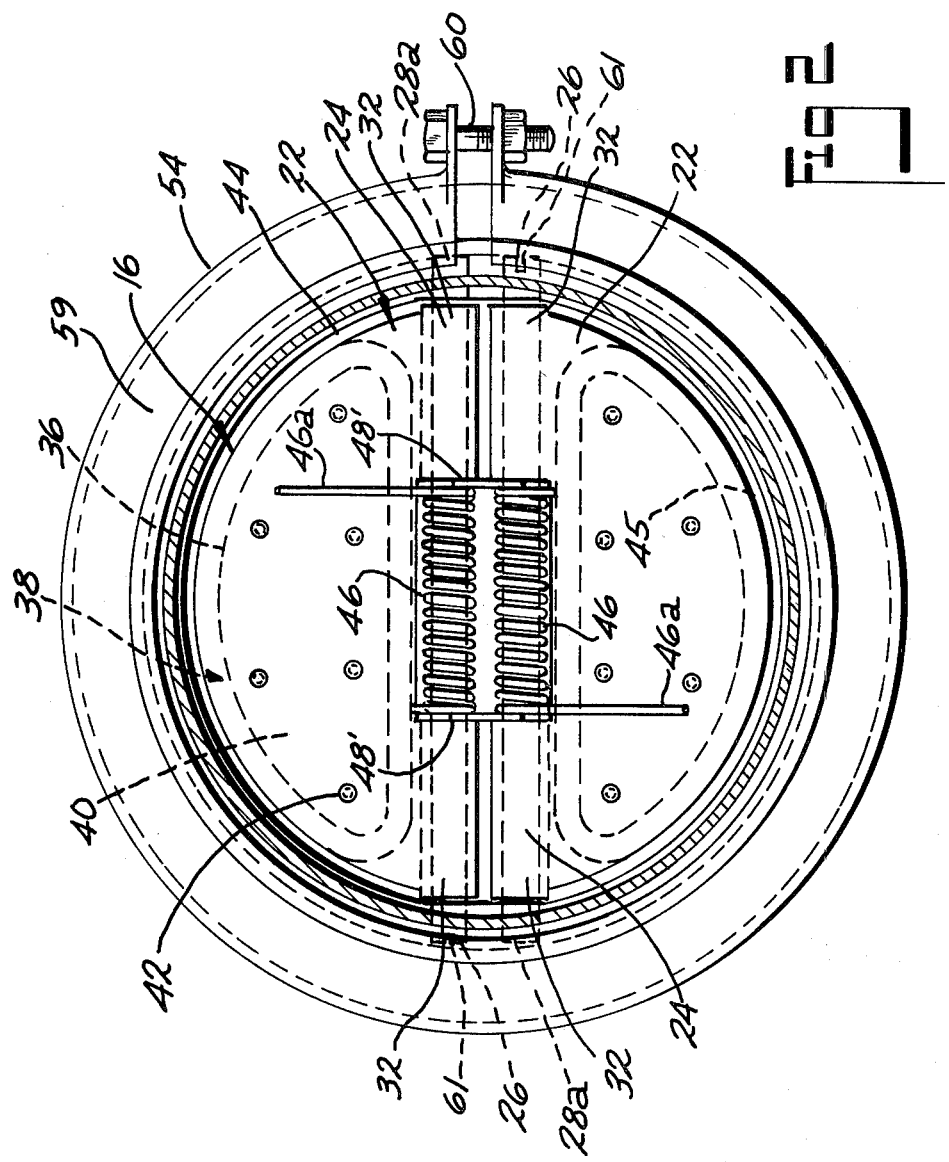

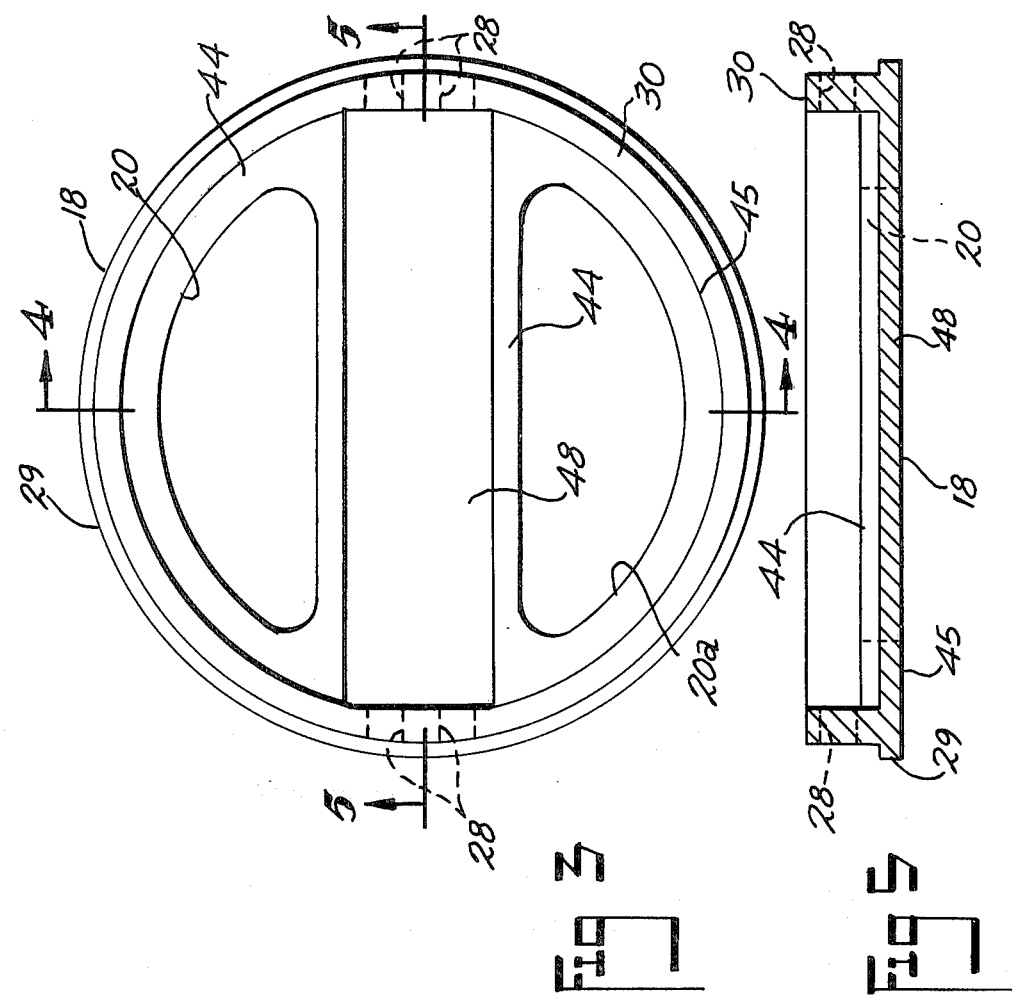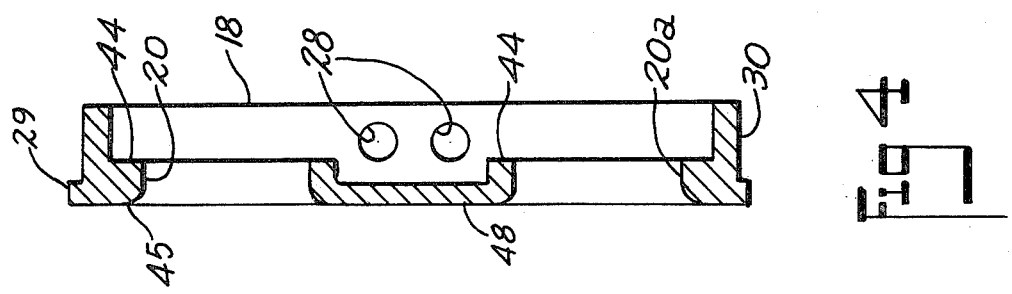

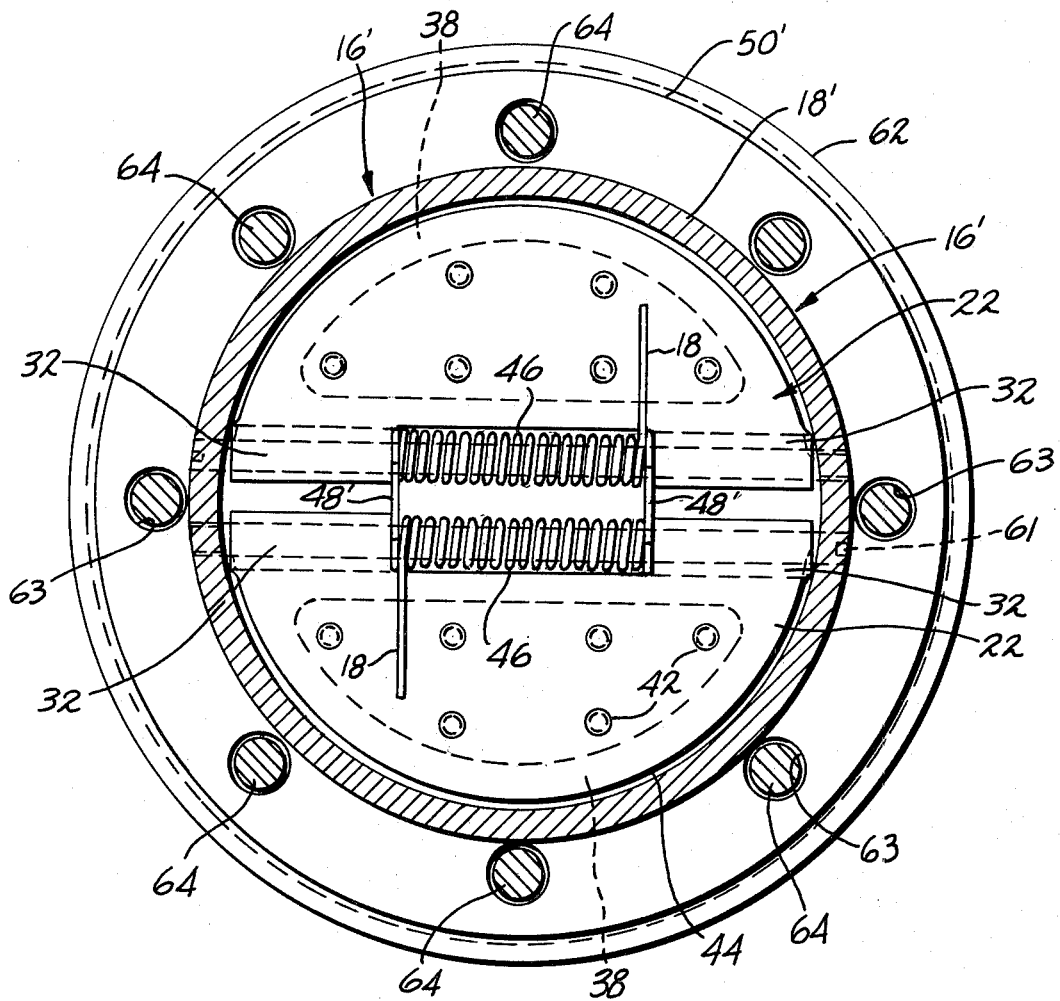
Fig II

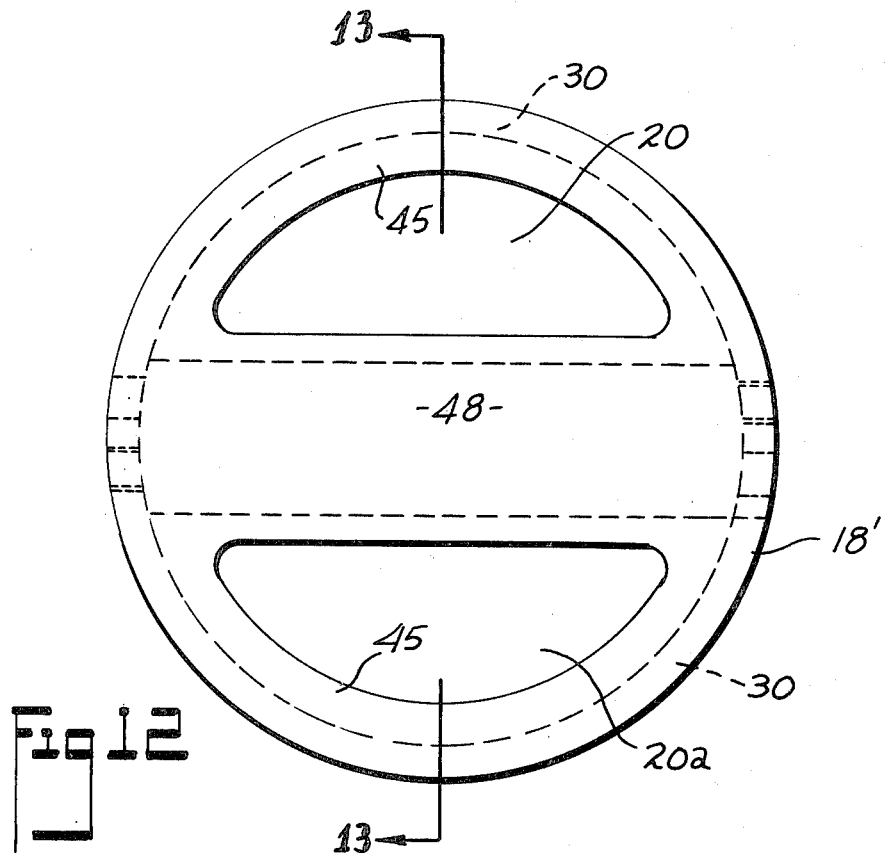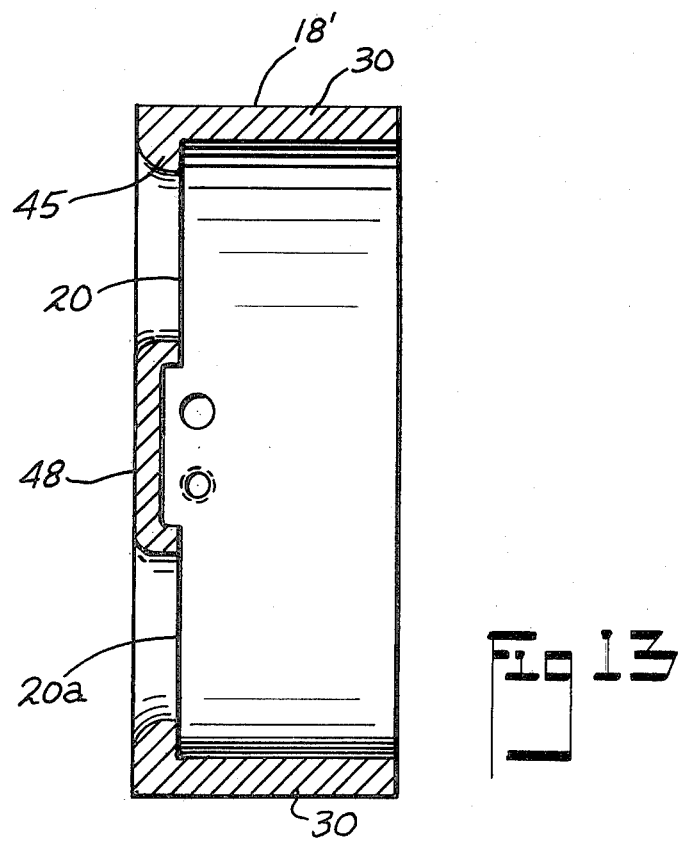

AIR CHECK VALVE ASSEMBLY FOR POWDERED BULK PRODUCT TRANSPORT

This invention relates in general to air check valve mechanism and more particularly to check valve mechanism used at a separable joint in a conduit assembly of a bulk haul transport trailer or the like adapted for handling powdered solids, such as for instance flour or cement or like products, which is unloaded from (or loaded into) the transport trailer by compressed air. The check valve mechanism is adapted to prevent reverse fluid flow in the conduit assembly and thereby aids in preventing damage to blowers or compressors which produce the compressed air flow in the conduit assembly for loading or unloading.

BACKGROUND OF THE INVENTION

Many air check valves presently being used in bulk haul transport for handling powdered solids, which are unloaded (or loaded) by compressed air, have been adapted for use from equipment originally designed for liquid flow. Accordingly they are generally heavy and expensive, and are usually in the form of a swing type valve many times aided in its movement toward a closed position by gravity. Thus, such prior art devices many times cannot be mounted in all positions in the conduit but instead must be mounted in a predetermined position so that the check valve member can operate properly and in the manner in which it was designed, and as for example in connection with the aforementioned swing type check valve.

Other lighter weight check valve mechanism for bulk product transport have been proposed, wherein a swingable valve plate on an apertured valve body is biased toward closed position by spring means, so that such valve can be positioned in a great plurality of positions in a conduit assembly, without affecting the operation of the valve plate in its opening and closing movements. However, such prior art arrangements usually require rather complex arrangements for positioning and sealing the check valve with respect to the conduit assembly, all of which complicate the assembly and disassembly of the check valve with and from the conduit assembly, resulting in increased initial costs of installation, as well as greater maintenance costs in the event of the need to repair the check valve. Moreover such lighter weight valve mechanisms generally are adapted for use with a predetermined size or diameter of conduit, and are not readily adaptable for use with other conduit diameters.

SUMMARY OF THE INVENTION

The present invention provides a novel, relatively light weight, air fluid check valve for use with bulk product transport, and adapted for ready insertion into and removal from the interior of a fluid flow conduit assembly at a separable joint therein without any necessity to be concerned with the rotative position of the valve with respect to the joint, with the valve including a valve body having means thereon for locating the valve in generally centered condition in the interior of the conduit assembly at the separable joint thereof, and including seal means coacting in sealing relation with the adjacent conduit sections and with the valve body, for sealing the conduit assembly and the check valve, against the inadvertent escape of fluid product.

Accordingly, an object of the invention is to provide a novel air fluid check valve assembly for use in bulk product transports.

Another object of the invention is to provide a novel air fluid check valve of the above type for assembly in the interior of a pair of generally juxtaposed conduit sections of a conduit assembly having a separable joint therebetween, and wherein the check valve includes a valve body having generally radially extending means thereon for locating or positioning the valve in the interior of the conduit sections at the separable joint, and including a single seal member encompassing the conduit joint, and coacting in sealing relation with the locating means on the valve body, and with the exterior peripheries of the conduit sections at the separable joint, for sealing the separable joint and for preventing leakage of fluid in the conduit sections externally of the valve body.

A still further object of the invention is to provide the combination of an air fluid check valve and a pair of generally aligned conduit sections coacting with one another in generally juxtaposed condition at a separable joint thereof, for the flow of powdered bulk materials therethrough, and wherein the check valve has a valve body with at least one opening therethrough normally closed by a spring loaded valve plate pivotally mounted on the valve body and urged in the direction toward the opening into sealing relation with the periphery thereof, with the valve body including radially extending means received at the separable joint between the coacting conduit sections, for locating the valve interiorly of the conduit sections at said separable joint thereof, and including a single resilient seal member encompassing the conduit sections at said joint and coacting with the exterior peripheries thereof and with said radial locating means on the valve body in sealing relation for sealing the separable joint of the conduit sections, and also preventing leakage of fluid in the conduit sections externally of the valve body.

A further object is to provide an assembly of the latter described type wherein the seal member is of generally E-shaped configuration in axial section, with a split ring clamping member coacting with the seal member for compressing the latter radially inwardly into said sealing relation.

A still further object of the invention is to provide an air fluid check valve adapted for use in a conduit assembly at a separable joint therein, and one that can be readily assembled into and removed from the conduit assembly without the necessity of being concerned with the rotative position of the valve with respect to the conduit assembly, and wherein the valve body includes means thereon for generally centering the valve with respect to the axial center of the conduit assembly together with means on one end of the valve body providing an inwardly directed seat for a spring loaded pivotal valve plate, and wherein the valve can be effectively utilized in sealing relation with various diameters of conduit assemblies.

Other objects and advantages of the invention will be apparent from the following description, taken in conjunction with the accompanying drawings wherein:

BRIEF DESCRIPTION OF THE DRAWINGS

FIG. 1 is a partially broken, side elevational view illustrating a pair of conduit sections disposed in generally axially aligned, juxtaposed relation with one another, and with the check valve disposed internally of the conduit sections, at the separable joint therebetween.

FIG. 2 is an end elevational view taken generally along the plane of line 2—2 of FIG. 1 looking in the direction of the arrows;

FIG. 3 is an end elevational view of the body of the check valve of FIGS. 1 and 2;

FIG. 4 is a sectional view taken generally along the plane of line 4—4 of FIG. 3 looking in the direction of the arrows;

FIG. 5 is a sectional view taken generally along the plane of line 5—5 of FIG. 3 looking in the direction of the arrows;

FIG. 11 is a sectional view of the assembly of FIG. 10 taken generally along the plane of line 11—11 of FIG. 10, looking in the direction of the arrows.

FIG. 12 is an end elevational view of the body of the check valve of FIGS. 10 and 11, taken from the left hand side of FIG. 10.

FIG. 13 is a sectional view taken generally along the plane of line 13—13 of FIG. 12, looking in the direction of the arrows.

DESCRIPTION OF THE PREFERRED EMBODIMENTS

Figure 7:
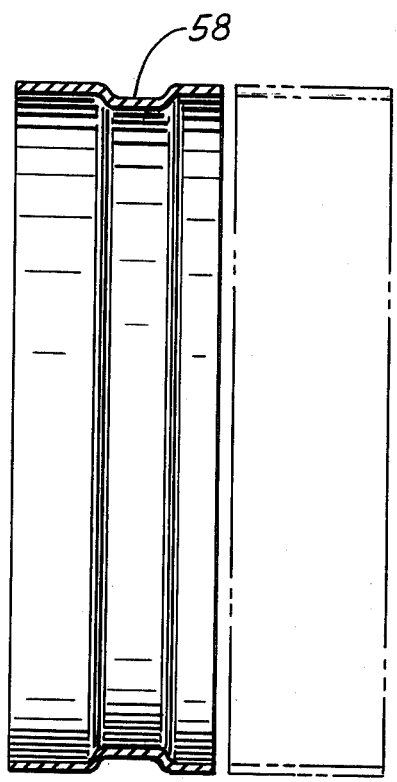
FIG. 7 is a sectional view of a conduit section assembly having a slightly different configuration, especially as compared to the conduit section on the left hand side of the assembly of FIG. 1.

Referring now again to the drawings, and particularly to FIGS. 1 and 2 thereof, there is illustrated a pair of axially aligned conduit sections 10, 12 which are disposed in axially aligned, slightly spaced relation in a separable joint assembly, and check valve 16 is removably disposed interiorly of the conduit sections at the separable joint 14 thereof. Such an assembly may be found for instance in a bulk hauling vehicle for use in handling powdered solids, such as for instance cement or flour.

Check valve 16 includes a body 18 (FIGS. 2,3,4, and 5) which has in the embodiment illustrated a plurality of spaced, generally seim-elliptical openings 20, 20a, therethrough, with such openings being adapted to be closed by means of an associated valve plate assembly 22, respectively pivoted, as at 24, by an associated transversely extending supporting pin 26, pins 26 at the ends thereof extend into generally snug fitting relation in openings 28 formed in the valve body 18, for mounting the pin on the valve body. One end of pins 26 may be threaded as at 28a, for being received in threaded relation with the complementary opening 28 in the valve body, such opening being likewise threaded. Valve body 18 includes radially extending shoulder or rim 29 at one end of the body, and longitudinally extending skirt portion 30 extending lengthwise therefrom, for a purpose to be hereinafter described.

Figure 8:
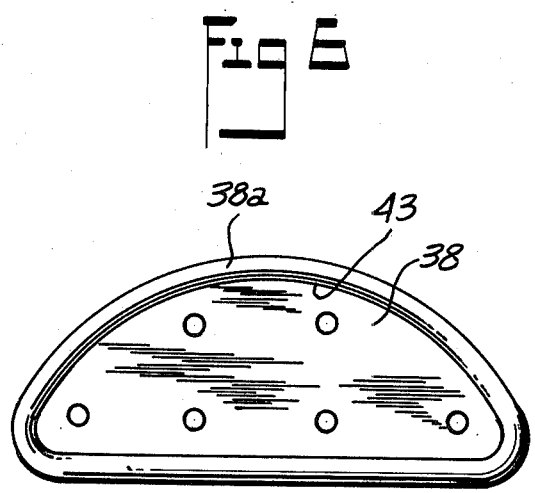
FIG. 8 is a plan view of the gasket member adapted to be mounted on the spring biased valve plate for sealing engagement with the periphery of the opening through the valve body of the check valve, when the valve plate is in closed condition.
Figure 10:
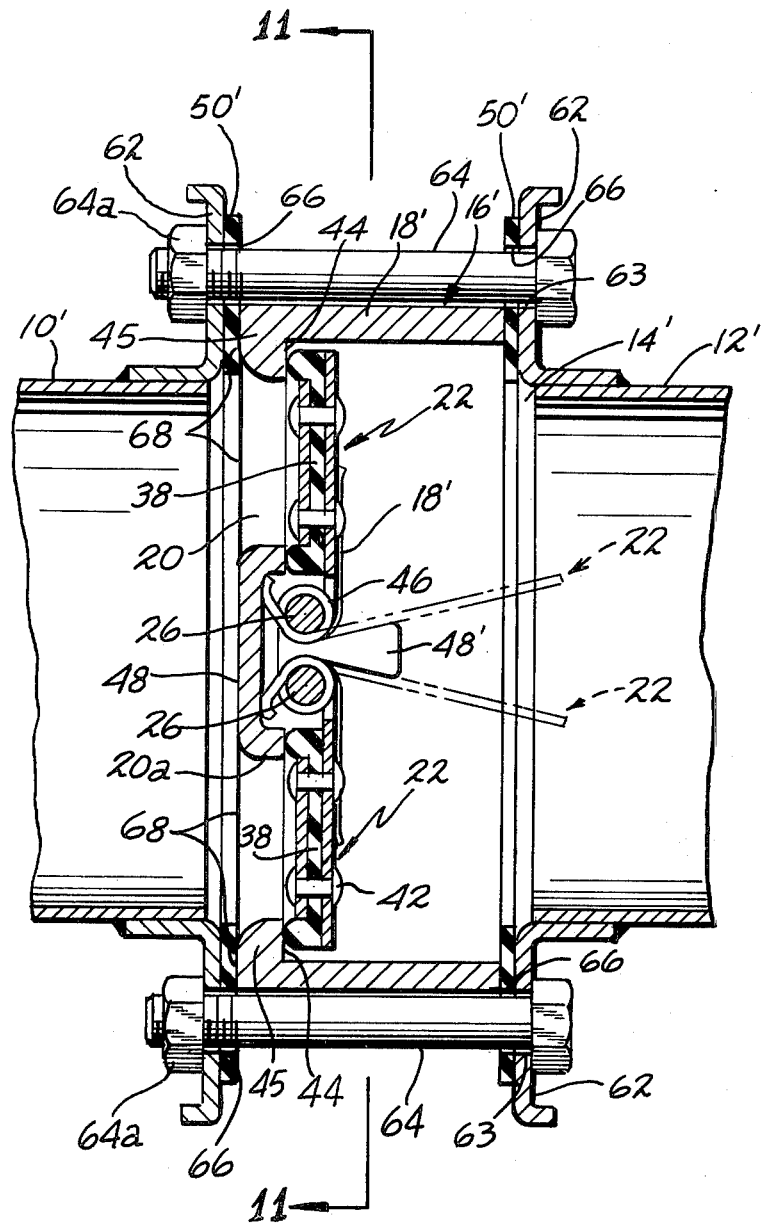
FIG. 10 is a longitudinal sectional view of another embodiment of check valve.

Each of the valve plate assemblies in the embodiment illustrated include spaced pivotal mounting portions 32 (FIG. 2) on the main plate member 36, adapted to receive in relative pivotal relation the associated mounting pin 26. An elastomeric gasket or seal member 38 (FIGS. 1 and 8) is provided in conjunction with an auxiliary plate member 40 which sandwiches the gasket member 38 between the main plate member 36 and the auxiliary plate member 40. Fasteners, such as for instance rivets 42, maintain the gasket 38 and auxiliary plate member 40 in assembled relationship with the main plate member.

Gasket member 38, as can be seen, preferably includes a centralized recess 43 therein, which receives the auxiliary plate member 40 therein and with the gasket member having a peripherial raised border 38a, for sealing relationship with the confronting, preferably machined surface 44 on lip 45 adjacent and encompassing the respective opening 20 or 20a in the valve body 18, for effective sealing relationship between the valve plate assembly and the valve body, when the respective valve plate assembly is disposed in the closed condition illustrated in full lines in FIG. 1. Gasket 38 is preferable formed of abrasion resistant, high temperature resistant elastomeric material, such as various compositions of rubber, known in the art, one such commercially available rubber composition being identified as "Viton".

The valve plate assemblies are each biased toward the closed position illustrated in FIG. 1 by means of a torsion spring 46 mounted on the respective shaft or pin 26 and in the area between pivotal mounting portions 32 of the valve plate of the respective assembly. One end of the torsion spring extends as at 46a into biasing engagement with the associated plate member 36, while the other end of the torsion spring extends as at 47 into coaction with the recessed cross rib portion 48 of the valve body, so as to maintain the torsion bias of the spring against the respective valve plate assembly, thus urging the latter toward closed condition.

When predetermined fluid pressure is applied interiorly of the conduit assembly in the direction of the full line arrow illustrated in FIG. 1, and against the valve plate assemblies 22, they are forced to swing toward open position as illustrated for instance in phantom lines, against the resistance of the associated spring member 46. Spaced tops 48' may be provided, which in the embodiment illustrated comprise plate-like members having spaced openings therethrough which receive therethrough pins 26 and mount members 48' on the pins. Members 48' limit the opening movement of the valve plate assemblies to a maximum position as illustrated in phantom lines in FIG. 1. These shoulders or stops may be disposed laterally of the associated springs as can be best seen in FIG. 2, and do not interfere with the mounting of the valve plate assemblies on the respective pin, nor do they interfere with the flow of pressurized powdered product through the conduit sections and through openings 20, 20a on the check valve.

In accordance with the invention, a seal member 50 (FIG. 6) is provided in encompassing relationship to the separable joint 14 of the axially aligned conduit sections for sealing relationship with the exterior peripheries of the conduit sections, and also for sealing relationship with the peripheral shoulder or rim 29 on the valve body extending radially at joint 14, and locating the check valve in the interior of the conduit assembly at separable joint 14.

Figure 6:
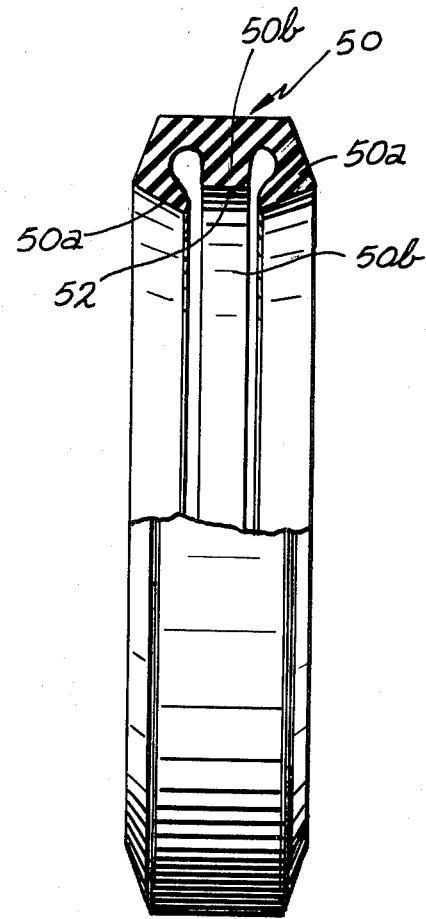
FIG. 6 is an enlarged, partially sectioned, elevational view of the resilient seal member adapted to encompass the valve-conduit section assembly at the separable joint thereof.
Figure 9:
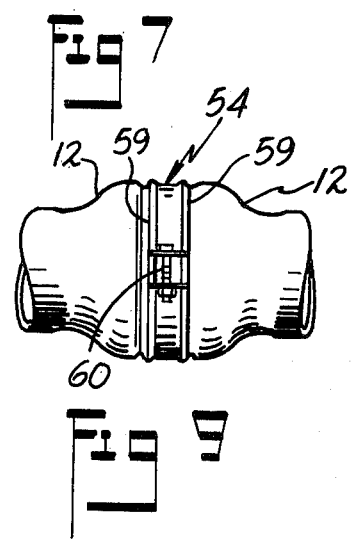
FIG. 9 is a reduced size, elevational view of the valve-conduit assembly with the split ring clamp (as assembled with the conduit sections) that is adapted to compress the seal member of FIG. 6 into sealing relation with the conduit sections of the assembly, and into sealing relation with the radial positioning means on the body of the check valve of FIG. 1.

Ring 50 is of generally E-shaped configuration in longitudinal section as can be best seen in FIG. 6, with the outer arms 50a of the E-shape diverging inwardly toward one another in the general direction of the longitudinal axis of the circular seal 50, in the non-mounted or uncompressed condition of the seal member. The central arm 50b of the seal member is of generally block-like configuration in section, and has a considerable extension of longitudinally extending sealing surface 52 thereon, to provide a substantial bridging and sealing relationship with the juncture joint 14 of the conduit sections 10 and 12, as well as with the confronting exterior surface of the rim 29 on the valve body thus preventing leakage of fluid interiorly of the conduit sections to externally of the check valve body.

Referring now to FIG. 1, when the sealing member 50 is applied to the separable joint 14 between the conduit sections and compressed, the arms 50a of seal 50 are compressed inwardly as illustrated, so as to biasingly engage in sealing relation the confronting exterior peripherial surface of the associated conduit sections, while the central arm 50b bridges in sealing relation the joint gap between the conduit sections, which gap is occupied as aforedescribed by the peripheral rim or shoulder 29 of the valve body. Arm 50b engages in sealing relation with the peripherial exterior surface of rim 29.

A split housing or ring 54 may be provided which encompasses the seal member 50, and compresses it into sealing relationship with the encompassed conduit sections and the rim 29 of the valve body as aforedescribed, thus sealing the joint 14 from escape of fluid product passing through the conduit sections, as well as sealing the valve from flow of fluid in the conduit sections to externally of the valve body. When the valve plate assemblies 22 are disposed in closed condition, the check valve 16 sealingly separates conduit section 10 from conduit section 12, and vice versa.

Conduit sections 10 and 12 preferably embody peripherial grooves or offset sections 58, therein in which the side sections 59 of the split ring 54 are received, to locate the seal member 50 and associated ring 54 with respect to the separable joint 14. It will be seen that even if the split ring 54 shifts or moves longitudinally of conduit sections, the engagement of the side wall sections 59 of the split ring with the confronting defining surface of the respective indentation will so limit the movement of the associated seal 50 that the central leg 50b of the seal member 50 can not move longitudinally out of bridging sealing relationship with the separable joint 14 of the conduit sections, and the confronting surface of the rim 29 of the valve body, thus insuring that the joint and the valve member will positively be maintained in sealed relationship upon application of the seal member 50 and associated split ring 54 to the assembly. As can be seen from FIG. 1, the exterior of seal 50 generally conforms to the interior configuration of the split ring upon clamping (as by means of threaded fastener 60) of the split ring into compressing relation with the seal member 50.

The valve plate assemblies 22 can be readily connected to the valve body 18 by means of the associated pin, by driving the pin through the respective receiving opening in the valve body and through the aligned pivotal portions 32 of the respective valve assembly until the other end of the pin is received in the corresponding spaced opening 28 in the valve body, (either in frictional or in threaded relation) thus mounting the pivotal plate assemblies on the valve body. If the pins are threaded at one end, slot 61 (FIG. 2) may be provided in the opposite end for turning purposes. When the check valve is inserted into the interior of the associated conduit sections, at the separable joint between the conduit sections, the relatively close fit between the exterior of the skirt portion 30 of the body of the check valve and the interior surface of the associated conduit section, will prevent disassembly of the pins from their mounted relationship in the openings 28 in the valve body.

The check valve assembly is such that it can be rapidly and expeditously assembled into a conduit section of an assembly at a separable joint thereof, and the seal member 50 and associated split ring 54 can be just as rapidly assembled, to seal the check valve assembly with respect to the conduit sections.

In the event of the need of replacing the check valve, only the compressing ring 54 and the seal member 50 need be removed to permit access to the check valve assembly by separating the conduit sections at the joint 14, and replacing the check valve if that becomes desirable or necessary.

The check valve assembly is preferably formed of stainless steel and aluminum parts, although other materials may be utilized. The assembly is particularly adapted for loading and unloading bulk material, such as for instance flour or cement or the like, into and from a mobile transport vehicle, and is used to prevent reverse flow of the bulk product in the conduit section assembly so as to aid in preventing damage to blowers or compressors utilized for handling the powdered solids, that are loaded or unloaded by compressed air. The arrangement is relatively light weight and compact, and relatively simple in construction, aiding in maintaining lower costs of installation and maintenance.

Referring now to FIGS. 10–13 there is illustrated another embodiment of air fluid check valve assembled into a conduit assembly at a separable joint thereof. In this embodiment the conduit sections 10', 12' disposed in generally axially aligned axially spaced relation each embody generally radially extending flange portions 62 having openings 63 therein spaced about the respective flange portion. Openings 63 are adapted to receive therethrough fastening means, such as threaded bolts 64 and associated nuts 64a, for drawing the conduit sections axially toward one another and into sealing engagement with the check valve 16' disposed between the flange portions 62 of the conduit assembly.

In this embodiment, the defining outer exterior surface of the body member 18' of the valve is preferably of generally smooth cylindrical configuration (FIGS. 12 and 13) and such body surface is adapted to be disposed in generally juxtaposed relation with the aforementioned fasteners 64 extending between the flange portions of the conduit assembly, for positioning the valve in generally centered condition between the conduit sections, at the separable joint 14'. Sealing rings 50' are disposed between each end of the valve 16' and the confronting surface of the respective flange on the respective conduit section; when the fasteners 64, 64a are tightened, and sealing rings 50' are compressed between the ends of the body 18' of the valve 16' and the respective flange, to seal the check valve with respect to the conduit sections, and thus prevent fluid and product disposed interiorly of the conduit sections from leaking to exteriorly of the check valve. Sealing rings 50' preferably have openings 66 therethrough spaced circumferentially thereabout, for receiving the respective fastener therethrough. As can be seen, the exterior end surface 68 of the lip 45 defining the valve seat 44 on the valve body 18' which seat 44 is adapted for sealing coaction with the associated pivotal valve plate assembly 22, provides a surface for sealing with the aforementioned sealing ring 50'. Loosening or removal of the fasteners 64, 64a, permits ready and rapid removal of the check valve 16' from the conduit assembly joint 14' for either repair or replacement, with the valve being assembleable into the joint in any rotated condition with respect to the conduit sections without having any material effect on the operation of the pivotal valve plate assemblies. In other respects check valve 16' of this embodiment is generally similar to that of the previous embodiment, with like parts having been designated with like reference numbers.

This embodiment of check valve also can be assembled with various diameters of conduit sections, the only requirement being that there be sufficient surface provided or available on the flange of the respective conduit section so as to engage in sealing relationship with the associated sealing ring 50' and against the confronting surface 68 of the lip portion 45 of the body 18' of the check valve. In other words, it will be seen that the conduit sections 10',12' illustrated in FIGS. 10 and 11 could be smaller in diameter then those illustrated, or could likewise be of larger diameter than those illustrated. However, the generally juxtaposed relationship between the longitudinal exterior surface of the body 18' of the valve and the fasteners 64 is maintained in either instance, for generally centering the check valve interiorly of the conduit assembly.

From the foregoing discussion and accompanying drawings, it will be seen that the invention provides an air fluid check valve assembly for use with conduit sections at a separable joint thereof, and one which can be readily assembled into or disassembled from the interior of the associated conduit sections, with the valve having a valve body with means thereon for locating the check valve generally centrally in the interior of the conduit sections at the joint, and with there being provided seal means coacting with the valve body, for sealing the separable joint of the conduit sections, and for preventing leakage of fluid in the conduit sections to externally of the valve body. The invention also provides in one embodiment thereof a check valve which can be assembled with different diameters of conduit sections, using one standard diameter of check valve body.

The terms and expressions which have been used are used as terms of description and not of limitation, and there is no intention in the use of such terms and expressions of excluding any equivalents of any of the features shown, or described, or portions thereof, and it is recognized that various modifications are possible within the scope of the invention claimed.

What is claimed is:

1. An air fluid check valve adapted for ready insertion therein and removal from the interior of a conduit assembly at a separable joint therein, the conduit assembly being adapted for use for instance on a bulk hauling transport vehicle for powdered solids, comprising a valve body having means thereon for locating the valve in generally centered condition in the interior of the conduit assembly at said joint, said body having an opening therethrough for the passage of fluid, a spring loaded valve plate pivotally mounted on said body and adapted to be urged in a direction to close said opening, but being pivotal to an open position upon application of predetermined fluid pressure in the conduit assembly to said valve plate, for permitting passage of fluid through said valve opening, resilient seal means adapted to coact in sealing relation with said valve body, for sealing the separable joint of the conduit assembly and for preventing leakage of fluid from interiorly of the conduit assembly externally of the valve, and wherein said seal means comprises a seal member adapted to encompass the conduit joint and to coact in sealing relation with said means on said valve body.

2. A valve in accordance with claim 1 wherein said means on said valve body comprises a peripheral rim for insertion between confronting ends of the conduit sections of the joint of the conduit assembly to position the valve in the conduit assembly, said valve body including a skirt portion extending axially of said rim and being adapted to be received in closely spaced relation to the interior of the associated conduit section.

3. A valve in accordance with claim 1 wherein said seal member comprises a generally resilient ring of generally E-shaped configuration in axial cross section.

4. A valve in accordance with claim 1 wherein said valve plate includes a gasket for sealing engagement between said valve plate and the periphery of said opening in the closed position of said valve plate.

5. A valve in accordance with claim 2 wherein said valve body at one end thereof includes an inwardly extending lip extending about said opening and providing a seat interiorly of the valve body for said valve plate in the closed condition of the latter, said lip being disposed generally radially inwardly of said rim.

6. A valve in accordance with claim 2 wherein said rim extends radially outwardly a distance sufficient to locate the distal end thereof substantially at the external periphery of the conduit assembly at said separable joint.

7. A valve in accordance with claim 2 wherein said valve plate is pivotally mounted on said body by means of a pin extending transverse said valve body with the ends of said pin being received in mounting openings in said skirt portion of said body.

8. A valve in accordance with claim 3 wherein said seal member includes a housing adapted to encompass said ring thereof and to clampingly force it into sealing relation with the conduit assembly at the separable joint thereof.

9. A valve in accordance with claim 3 wherein the exterior arms of said E-shaped in section ring in non-compressed condition slope diagionally with respect to one another and in a direction toward the longitudinal axis of said ring, with the distal ends of said diagionally sloping arms being adapted to engage the external periphery of said conduit assembly.

10. A valve in accordance with claim 8 wherein said conduit assembly comprises a pair of generally axially aligned conduit sections, each of said conduit sections including an exterior indentation therein, spaced axially from said joint and adapted for coaction with said housing for restraining axial movement of said housing and associated seal member relative to said joint.

11. A pair of generally axially aligned conduit sections disposed in a conduit assembly for a bulk hauling vehicle for use in handling powdered solids, said conduit sections being disposed in generally juxtaposed relation with respect to one another at a separable joint therebetween, and an air fluid check valve assembled into the interior of said conduit sections at said separable joint, said valve comprising a valve body having means extending generally radially thereof, for locating the valve in the interior of said generally juxtaposed conduit sections at said separable joint, the last mentioned means separating said conduit sections at said joint, said valve body having a pair of spaced openings therethrough, a pair of spring loaded valve plate assemblies pivotally mounted on said body and being urged in directions to normally close the respective of said openings but being pivotal to open positions upon application of predetermined fluid pressure thereto in the conduit sections, for passage of fluid through said conduit sections and via said openings, a seal member encompassing said conduit joint and coacting with said radial means on said valve body for sealing the separable joint of said conduit sections and preventing leakage of fluid in the conduit sections externally of said valve body, clamping means coacting with said seal member and forcing the latter into tight sealing relation between the exteriors of said conduit sections at said joint and with said means on said valve body, said clamping means being removable for permitting ready access to said valve at said conduit joint.

12. The combination in accordance with claim 11 wherein said valve body at one end thereof includes inwardly extending lip means extending about the respective of said spaced openings and providing a seat interiorly of the valve body for the respective of said valve plate assemblies, said lip being disposed generally radially inwardly of said radial means.

* * * * *